(12) United States Patent
Fong et al.

(10) Patent No.: US 7,149,193 B2
(45) Date of Patent: Dec. 12, 2006

(54) DYNAMIC, DUAL-MODE WIRELESS NETWORK ARCHITECTURE WITH A SPLIT LAYER 2 PROTOCOL

(75) Inventors: Mo-Han Fong, L'Orignal (CA); Geng Wu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 1100 days.

(21) Appl. No.: 09/733,492

(22) Filed: Dec. 8, 2000

(65) Prior Publication Data

US 2002/0072382 A1 Jun. 13, 2002

Related U.S. Application Data

(60) Provisional application No. 60/176,985, filed on Jan. 19, 2000, provisional application No. 60/170,909, filed on Dec. 15, 1999.

(51) Int. Cl.
*H04Q 7/00* (2006.01)
*H04J 3/16* (2006.01)
*H04J 3/22* (2006.01)

(52) U.S. Cl. ........................ 370/328; 370/469

(58) Field of Classification Search ........... 370/328, 370/469, 464–465
See application file for complete search history.

(56) References Cited

U.S. PATENT DOCUMENTS 6,181,683 B1 * 1/2001 Chevillat et al. ........... 370/329
6,374,112 B1 * 4/2002 Widegren et al. ......... 455/452.2
6,434,367 B1 * 8/2002 Kumar et al. .............. 455/70
7,068,937 B1 * 6/2006 Combs et al. ............. 398/72
2002/0064142 A1 * 5/2002 Antonio et al. ........... 370/335

FOREIGN PATENT DOCUMENTS

| DE | 195 43 280 A | 5/1997 |
| EP | 0 777 396 A | 6/1997 |
| WO | WO 99 22741 A | 6/1999 |
| WO | WO 99/59354 | * 11/1999 |

* cited by examiner

*Primary Examiner*—Kevin C. Harper
(74) *Attorney, Agent, or Firm*—Mintz, Levin, Cohn, Ferris, Glovsky and Popeo, P.C.

(57) ABSTRACT

A wireless data network architecture supports both centralized mode operation and distributed mode operation. In the centralized mode, all of the Open Systems Interconnection (OSI) reference model data link layer, also known as layer 2, protocol functions are implemented within the radio access network control entity, such as at a base station controller (BSC) or similar network controller, before the data packets are delivered to one or more base station transceiver subsystems (BTSs). In the distributed mode, some of the layer 2 protocol functions are implemented at the BSC or similar network controller, and some of the layer 2 protocol functions are implemented at the BTSs. The data transmission is dynamically switched from one of the modes to the other as a function of various implementation-specific triggers.

28 Claims, 8 Drawing Sheets

DYNAMIC, DUAL-MODE WIRELESS NETWORK ARCHITECTURE WITH A SPLIT LAYER 2 PROTOCOL

RELATED APPLICATIONS

This application claims the priority of U.S. Provisional Application No. 60/170,909, filed Dec. 15, 1999 and the priority of U.S. Provisional Application No. 60/176,985, filed Jan. 19, 2000.

BACKGROUND OF THE INVENTION

The present invention is directed to data networks and, more particularly, to wireless data networks for providing mobile terminals and other devices with high speed data services such as high speed Internet services.

Wireless data networks are typically employed as an extension of a wired data network or in place of a wired data network to provide user access to networked data services. The wireless data networks reduce or eliminate the need for wired connections and thus permit fast setup of a data network as well as allow for simplified, low cost additions to and reconfiguration of the data network. The wireless data networks also facilitate the use of hand-held or notebook computers, personal digital assistants (PDA) or other hand-held or pocket devices to access the data services.

Presently, wireless data networks may be configured either as non-cellular wireless local area networks (LANs) or as cellular wireless data networks. Non-cellular wireless data networks, such as peer-to-peer wireless LANs or single or multiple access point wireless LANs, provide high data throughput and thus support high speed data services. However, the non-cellular wireless data networks do not permit a user's computer or other device to remain connected to the network when the computer or device is moved from within the communication range of one access point or peer device to within the range of another access point or peer device. Thus, non-cellular wireless data networks provide users with only limited mobility.

By contrast, cellular wireless data networks provide users with greater mobility. The cellular wireless data networks are divided into cells that function in a manner analogous to those of cellular mobile telephone network. At a given time, each computer or other device of the cellular wireless data network is associated with a respective access point and its corresponding cell or area of coverage. Communication between the computer or other device and the cellular wireless data network is "handed off" from one access point to another as the computer or other device roams from cell to cell. The cells overlap to permit continuous communication between the computer or other device and the cellular wireless data network. Thus, cellular wireless data networks extend the range that the computer or other device may be connected to the data network. Traditional cellular wireless data networks, however, have poor bandwidth efficiency, also known as spectral efficiency, It is therefore desirable to provide a wireless data network that is capable of providing high speed data services as well as permitting high user mobility.

SUMMARY OF THE INVENTION

The present invention provides a wireless network architecture that supports both distributed mode operation and centralized mode operation. The invention also provides a wireless network architecture that can also dynamically switch from one mode to another as a function of implementation-specific triggers.

In accordance with an aspect of the invention, wireless data communication is provided at a control entity. Data is received in accordance with an Open Systems Interconnection (OSI) reference model level 3 protocol. One of a centralized mode and a distributed mode is selected. When the centralized mode is selected, all operations of an OSI reference model layer 2 protocol are implemented to deliver the data to at least one transceiver device. When the distributed mode is selected, only a portion of operations of the layer 2 protocol is implemented to deliver the data to the at least one transceiver device. The portion of operations of the layer 2 protocol includes at least those of a centralized protocol sub-layer.

According to another aspect of the invention, wireless data communication is provided at a transceiver station. Data is received in accordance with a selected one of a centralized mode and a distributed mode. In accordance with the centralized mode, the data is received from a control entity subsequent to implementation of all of an Open Systems Interconnection (OSI) reference model layer 2 protocol. In accordance with the distributed mode, the data is received subsequent to implementation of a portion of the OSI reference model layer 2 protocol. When the distributed mode is selected, a further portion of the layer 2 protocol is implemented prior to transmitting the data. The further portion of the layer 2 protocol includes at least one distributed protocol sub-layer. An OSI reference model physical (PHY) layer protocol is implemented to transmit the data to a user device.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The present invention provides a wireless data network architecture that supports both centralized mode operation and distributed mode operation. In the centralized mode, all of the Open Systems Interconnection (OSI) reference model data link layer, also known as layer 2, protocol functions are implemented within the radio access control entity, such as at a base station controller (BSC) or similar network controller. In the distributed mode, some of the layer 2 protocol functions are implemented at the BSC or similar network controller, and some of the layer 2 protocol functions are implemented at the BTSs.

The data transmission to a mobile terminal may be dynamically switched from one of the modes to the other as a function of various implementation-specific triggers such as the data transmission rate, the mobility of the customer device and the type of user application. As an example, the distributed mode may be implemented when a data call is made to or received from a customer device that is a stationary device or that has very low mobility. Alternatively, the centralized mode may be implemented when the data call is made to or received from a customer device that is highly mobile.

As a further example, the distributed mode may be implemented when the data call accesses a data service or application that requires highly bursty traffic. Alternatively, the centralized mode may be implemented when the data call accesses a data application that requires stream-type traffic. Thus, transmission and protocol process resources may be dynamically adapted and optimized according to the quality of service requirements of a respective data service at various times during a data call.

The dual mode operation is supported by a split layer 2 protocol design. A medium access control (MAC) sub-layer of the layer 2 protocol is divided into two respective portions, as is a radio link protocol (RLP) sub-layer of the layer 2 protocol.

The MAC sub-layer is divided into a distributed MAC (D-MAC) sub-layer and a centralized MAC (C-MAC) sub-layer. The distributed MAC sub-layer is implemented by the BTSs. The centralized MAC sub-layer is implemented within the radio access network control entity, such as by the BSC.

The RLP sub-layer is similarly divided into a distributed RLP (D-RLP) sub-layer and a centralized RLP (C-RLP) sub-layer. The D-RLP sub-layer is implemented by the BTS and the C-RLP sub-layer is implemented by the BSC.

The MAC sub-layer is a protocol for providing level 2 functions such as for controlling access to and from the upper layer signaling, and for controlling data services and voice services to and from the physical layer resources. The RLP sub-layer is a protocol for providing level 2 functions such as best effort or reliable data delivery. During reliable data delivery, also known as non-transparent data delivery, data reliability is maintained using error recovery from retransmitted data packets. The retransmitted packets are sent in response to automatic repeat requests (ARQs) and may contain the same data that was originally transmitted or may contain only the parity bits that were encoded from the transmitted data, such as when packet combining at the receiving end RLP sub-layer is supported. During best effort or transparent data delivery, error recovery is not provided, and layer 2 byte count integrity is maintained using a data byte-addressing scheme.

The distributed RLP operation of the multiple BTSs and the centralized RLP operation of the BSCs are coordinated with each other to provide reliable layer 2 data transport and/or byte count integrity when a data application switches from the distributed mode to the centralized mode as well as when a data application switches from the centralized mode to the distributed mode.

Figure 1:
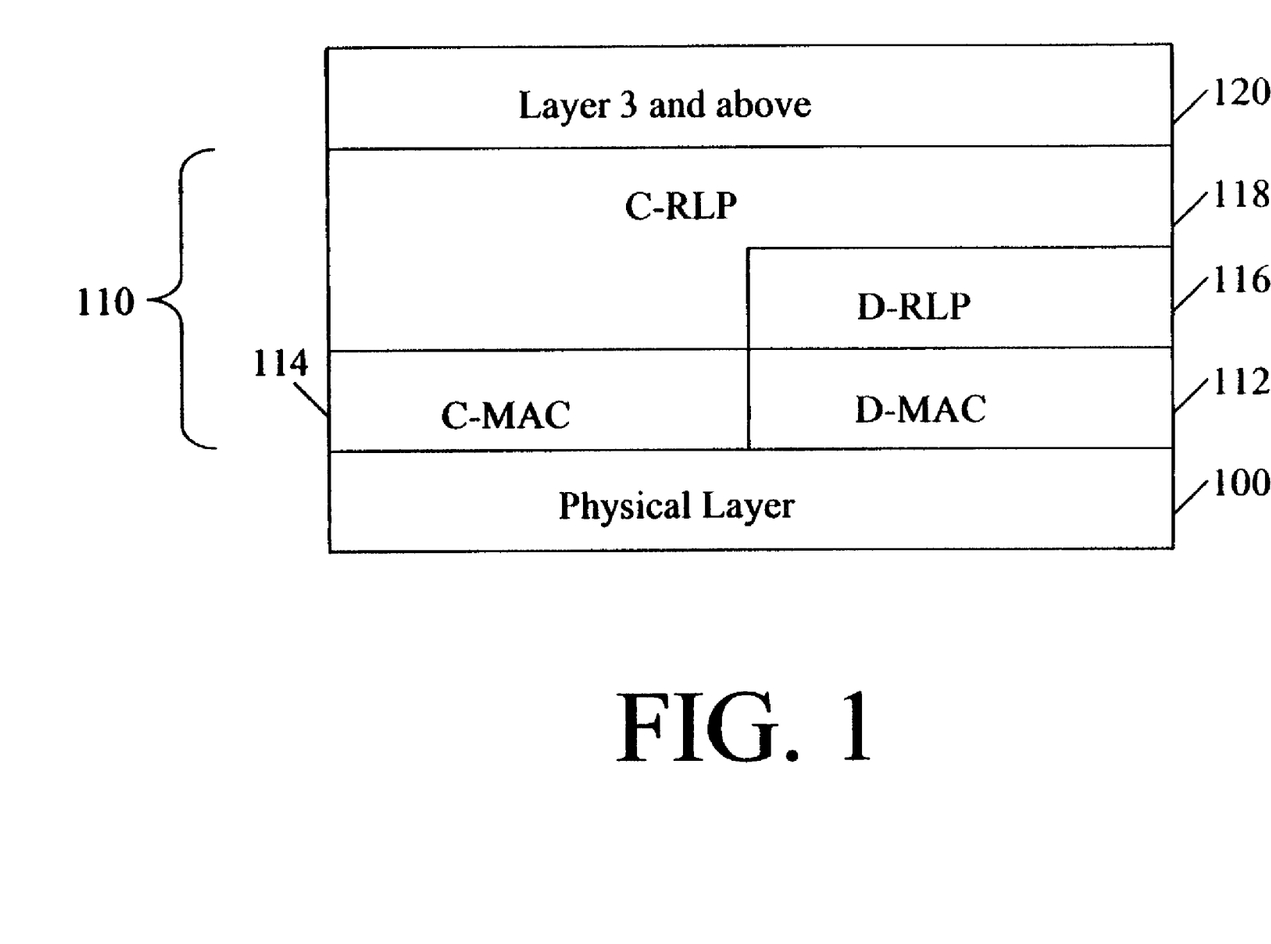
FIG. 1 shows a wireless protocol structure with a split layer 2 in accordance with the invention.

FIG. 1 illustrates a protocol structure having a split layer 2 110 according to the invention. A D-MAC sub-layer 112 and a C-MAC sub-layer 114 each reside directly atop a physical layer 100. A D-RLP sub-layer 116 resides directly atop the D-MAC sub-layer 112 for providing either transparent or non-transparent layer 2 data transport when the data network operates in the distributed mode. A C-RLP sub-layer 118 resides directly atop the D-RLP sub-layer 112 to anchor data flow from the network layer, also known as layer 3, and the higher protocol layers 120 to the D-MAC sub-layer 112 and provide either transparent or non-transparent layer 2 data transport.

The C-RLP sub-layer 118 also resides directly atop the C-MAC sub-layer 114 to anchor data flow from the layer 3 and other higher protocol layers 120 to the C-MAC sub-layer and provide either transparent or non-transparent layer 2 data transport.

Figure 2:
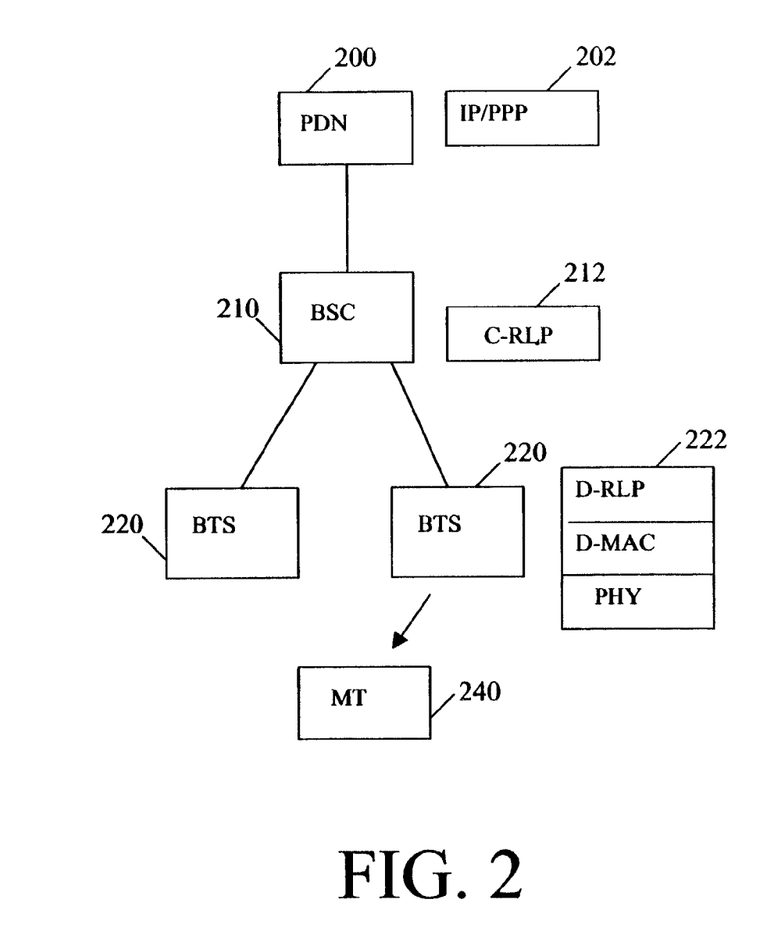
FIG. 2 is a block diagram showing a wireless network and the protocol layers and/or sub-layers associated with respective network elements for a distributed, single-cast mode in accordance with the invention.
Figure 3:
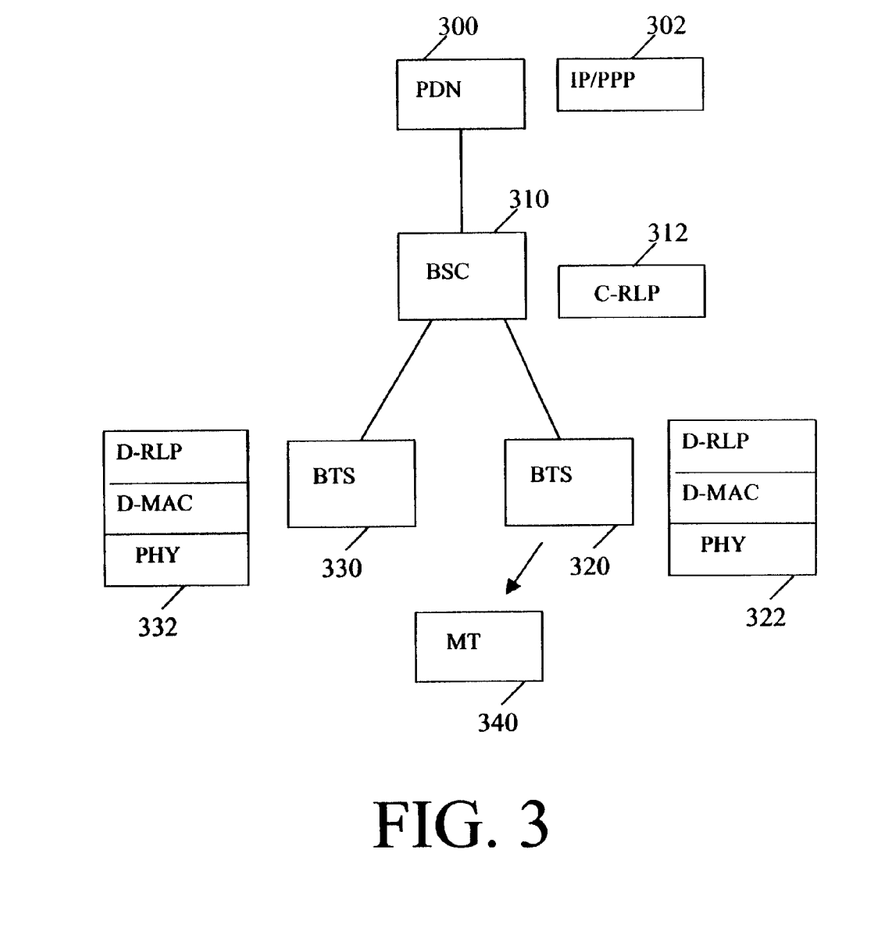
FIG. 3 is a block diagram showing a wireless network and the protocol layers and/or sub-layers associated with respective network elements for a distributed, multi-cast mode in accordance with the invention.
Figure 4:
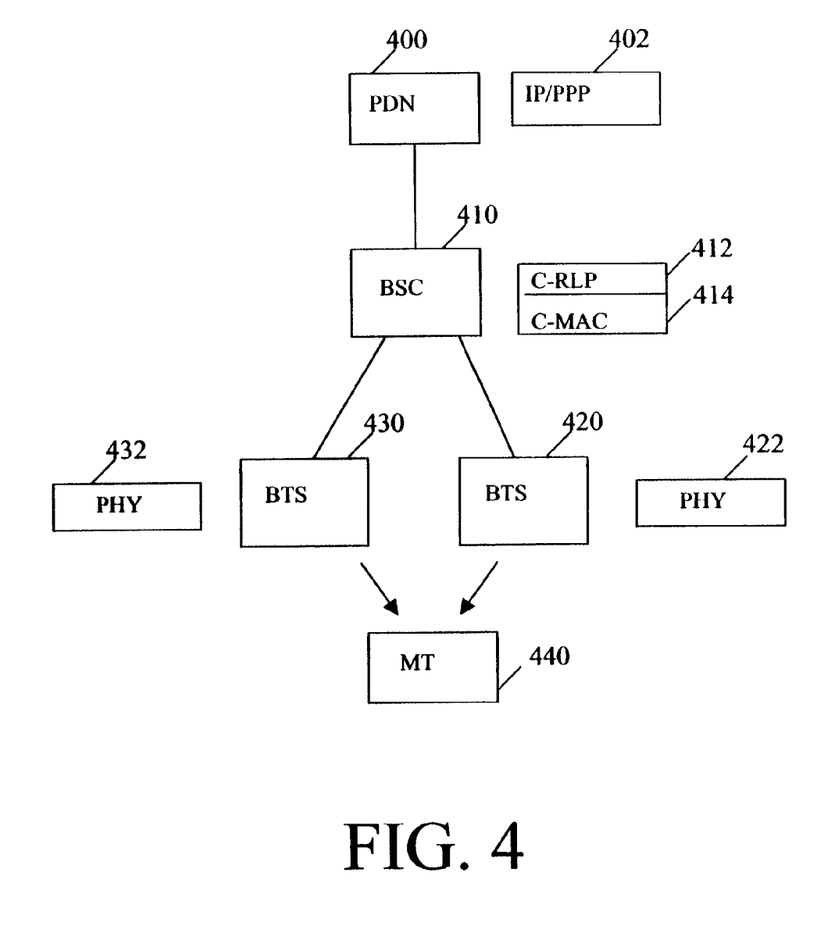
FIG. 4 is a block diagram showing a wireless network and the protocol layers and/or sub-layers associated with respective network elements for a centralized mode in accordance with the invention.

An example of a wireless network and the protocol layers and/or sub-layers associated with respective elements in the network is shown in FIGS. 2, 3 and 4.

FIGS. 2 and 3 depict the wireless network and associated protocol layers and/or sub-layers of the distributed mode. Each mobile terminal communicates with only one BTS at a time so that there is no soft handoff from one BTS to another BTS. The network may operate in a single-cast sub-mode in which the mobile terminal communicates with only one BTS for a relatively long duration before switching to another BTS or may operate in a multi-cast sub-mode in which the mobile terminal is always ready to switch from one serving BTS to another BTS.

FIG. 2 illustrates an example of the single-cast sub-mode of the distributed mode. A mobile terminal (MT) 240 receives data packets from and transmits data packets to a single BTS 220, namely, the BTS having the strongest pilot signal strength. The mobile terminal 240 may be either stationary or moving.

A packet data network (PDN) 200 receives and/or carries data from a networked data service or from a network device and implements layer 3 and above protocols, such as Internet Protocol/Point-to-Point Protocol (IP/PPP) 202, to deliver service data units (SDUs) to the base station controller (BSC) 210. The BSC implements the C-RLP sub-layer protocol 212 to direct the SDUs to a BTS 220. The BTS implements the D-RLP sub-layer, D-MAC sub-layer and Physical (PHY) layer protocols 222 to convert the SDUs to protocol data units (PDUs) and then transmits the PDUs to the mobile terminal 240.

FIG. 3 depicts an example of a network architecture and associated protocol layers and/or sub-layers of the multi-cast sub-mode of the distributed mode. In this sub-mode, a mobile terminal 340 may receive data packets from and/or transmits data packets to one of BTSs 320, 330 during a given time slot and then, during the interval between time slots, switch to another of the BTSs 320, 330 and subsequently receive data packets from and/or transmits data packet to that BTS.

The mobile station 340 determines when to switch from one BTS to another based on the current pilot signal strengths of the BTSs. The mobile terminal periodically measures the pilot signal strengths of "active" BTSs, namely the BTSs to which the mobile terminal may potentially switch, and maintains a list of the active BTSs and their respective pilot signal strengths. Typically, the strengths of the pilot signals change over time, and when the pilot signal strength of the BTS that is currently communicating with the mobile terminal falls below that of another active BTS, the mobile terminal generates a request to receive forward link data transmission from the BTS having the stronger pilot signal. The request may be generated immediately thereafter or after the expiration of a predetermined timer interval, or the request may be generated when the difference between the two pilot signals strengths exceeds a predetermined threshold value.

The number of active BTSs in the list is determined by an infrastructure device of the data network, such as by the BSC or by a similar network controller, and is transmitted to the mobile terminal when a data call is initiated. The threshold value and/or the timer value are also sent to the mobile terminal during initiation of the data call. The infrastructure device of the data network may also notify the mobile terminal of changes in the number of active BTSs in the list and in the threshold and timer values during the course of a call.

When a PDN 300 of FIG. 3 has received and/or has carried data from a networked data service or from a network device, the PDN implements IP/PPP 304 or other layer 3 and above protocols to deliver SDUs to a BSC 310. The BSC implements the C-RLP sub-layer protocol 312 to multi-cast the SDUs to each of the BTSs 320 and 330 of the active BTS list. Each of the BTSs 320 and 330 implements its D-RLP sub-layer, D-MAC sub-layer and Physical layer protocols 322 and 332, respectively, to convert the SDUs to PDUs. Only one of the BTSs, however, transmits the PDUs to the mobile terminal 340 at a given time, namely the BTS having the greater relative pilot signal strength.

By multi-casting the data from the BSC 310 to more than one BTS, a continuous flow of data from the PDN 300 to the mobile terminal 340 is maintained even when the mobile terminal 340 switches from one BTS to another in real time. Further, for a non-transparent RLP, a reliable data flow from the PDN 300 to the mobile terminal 340 is also maintained while the mobile terminal 340 switches from one BTS to another.

FIG. 4 shows the wireless network and its associated protocol layers and/or sub-layers for the centralized mode in which a mobile terminal 440 receives data packets from and transmits data packets to one or more BTSs 420, 430. Because all of the layer 2 protocol functions are implemented in the BSC, the centralized mode supports soft hand-offs from one BTS to another BTS. During a soft hand-off, both of the BTSs 420, 430 concurrently communicate with the mobile terminal 440.

A packet data network (PDN) 400 implements IP/PPP 402 or other layer 3 and above protocols to deliver SDUs to the base station controller (BSC) 410. The BSC implements the C-RLP sub-layer protocol 412 and the C-MAC sub-layer protocol 414 to direct the SDUs to BTSs 420 and 430. One of the BTSs implements its respective PHY layer protocol 422 or 432 to convert the SDUs to PDUs and then transmits the PDUs to the mobile terminal 340. Alternatively, such as during a soft hand-off, both of the BTSs implement their respective PHY layer protocol 422, 432, and both BTSs transmit to the mobile terminal 340.

Figure 5:
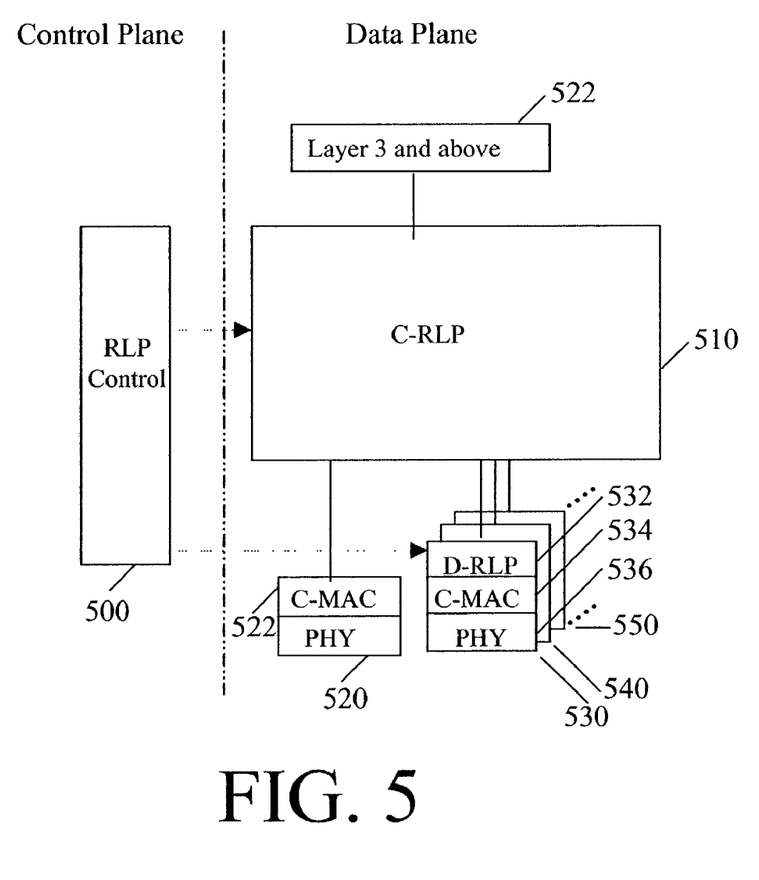
FIG. 5 is a block diagram showing an example of an arrangement for carrying out the directing of data packets under either the centralized mode or the distributed mode in accordance with the invention.

FIG. 5 shows an arrangement for carrying out the directing of data packets under either the centralized mode or the distributed mode in accordance with an embodiment of the invention. A C-RLP entity 510 and a D-RLP entity 532 provide forward link data transmission. The C-RLP entity 510, under the direction of a RLP control entity 500, receives layer 3 and above service data units (SDUs) 522. In the distributed mode, the C-RLP entity 510 implements the C-RLP sub-layer protocol to multicast the SDUs to a D-RLP entity 532, a D-MAC entity 534 and a PHY entity 536 in one or more combined units 530, 540, 550. The D-RLP entity 532 implements the D-RLP sub-layer protocol under the direction of the RLP control entity 500, the D-MAC entity 534 implements the D-MAC sub-layer protocol, and the PHY entity 536 implements the PHY layer protocol. In the centralized mode, the C-RLP entity 510 directs the SDUs to a C-MAC entity 522 and to a PHY entity 520. The C-MAC entity 522 implements the C-MAC sub-layer protocol, and the PHY entity 520 implements the PHY layer protocol to convert the SDUs to PDUs for transmission to a mobile terminal (not shown).

Figure 6:
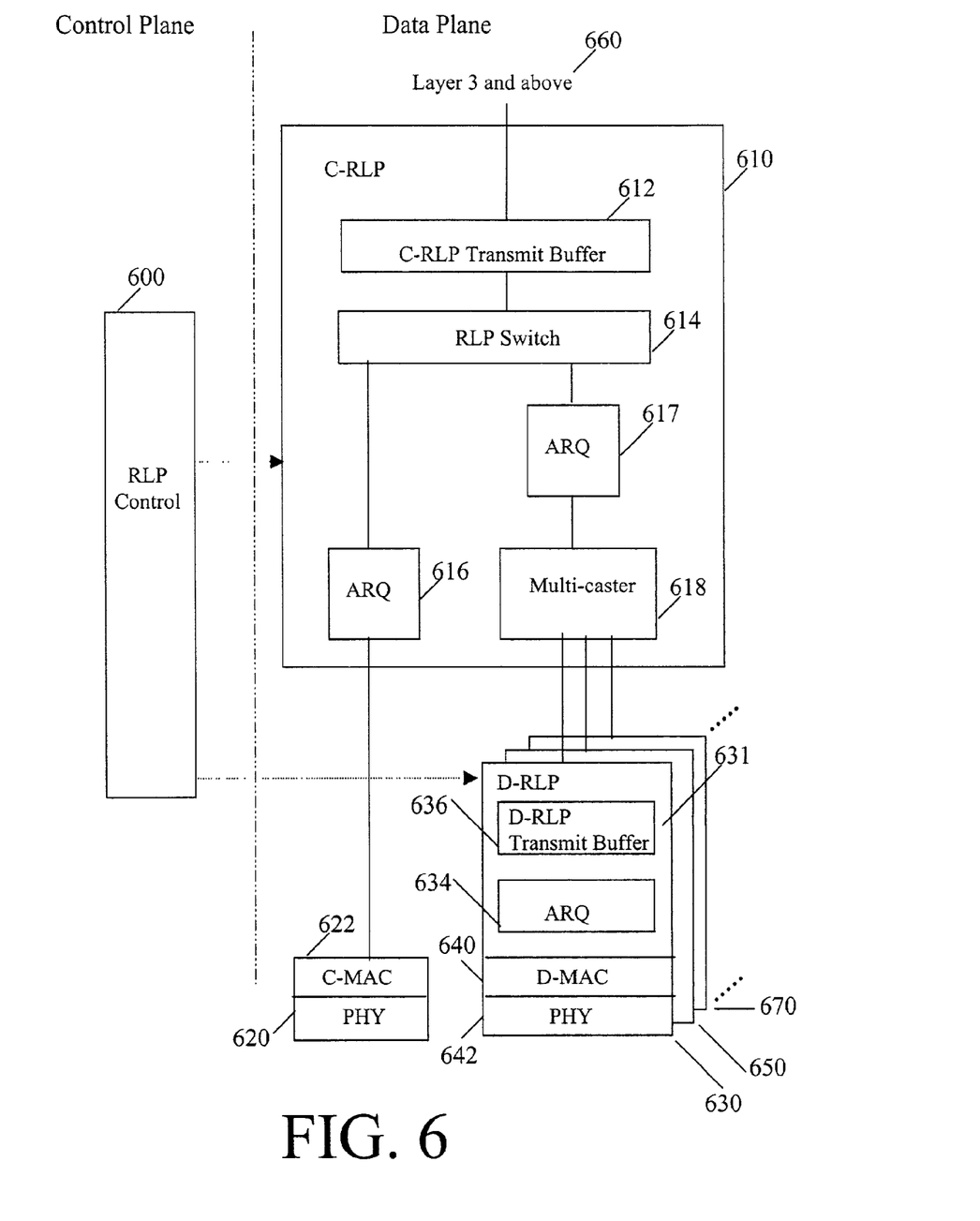
FIG. 6 is a block diagram showing a more detailed example of the arrangement of FIG. 5.

FIG. 6 illustrates the arrangement of FIG. 5 in greater detail. A C-RLP entity 610 includes a C-RLP transmit (Tx) buffer 612, a RLP switch 614, a centralized mode automatic repeat requestor (ARQ) 616, an optional, distributed mode ARQ 617, and a multi-caster 618. A D-RLP entity 631 includes a RLP transmit (Tx) buffer 636 and a further optional ARQ 634. A RLP control entity 600 controls the C-RLP and D-RLP entities in the manner described above to direct the distributed mode and the centralized mode.

The RLP transmit buffer 612 receives layer 3 and above SDUs 660 and delivers the SDUs to the RLP switch 614. In the distributed mode, when the ARQ function is implemented within the C-RLP entity 610, the RLP switch 614 directs the SDUs to the ARQ 617, which then directs the SDUs to the multi-caster 618. Alternatively, when the ARQ function is not implemented within the C-RLP entity 610, the RLP switch directs the SDUs directly the multicaster 618.

The multicaster 618 multicasts the SDUs to each of the combined units 630, 650, 670. The received SDUs are retained in the RLP transmit buffer 636 of the D-RLP entity 631. The D-RLP entity 631, the D-MAC entity 640 and the PHY entity 642 each implement their associated layer or sub-layer protocol, as described above.

For non-transparent data transmission, the ARQ function is implemented by the ARQ 617 within the C-RLP entity 610 or is implemented by ARQ 634 within the D-RLP entity 631. The ARQ 617 or 634 provides error recovery by retransmitting the PDUs, or the parity bits generated from encoding the PDU, to the mobile terminal when requested by the mobile terminal. For transparent data transmission, the ARQ 617 and the ARQ 634 are disabled, though byte count integrity is nevertheless maintained.

Figure 7:
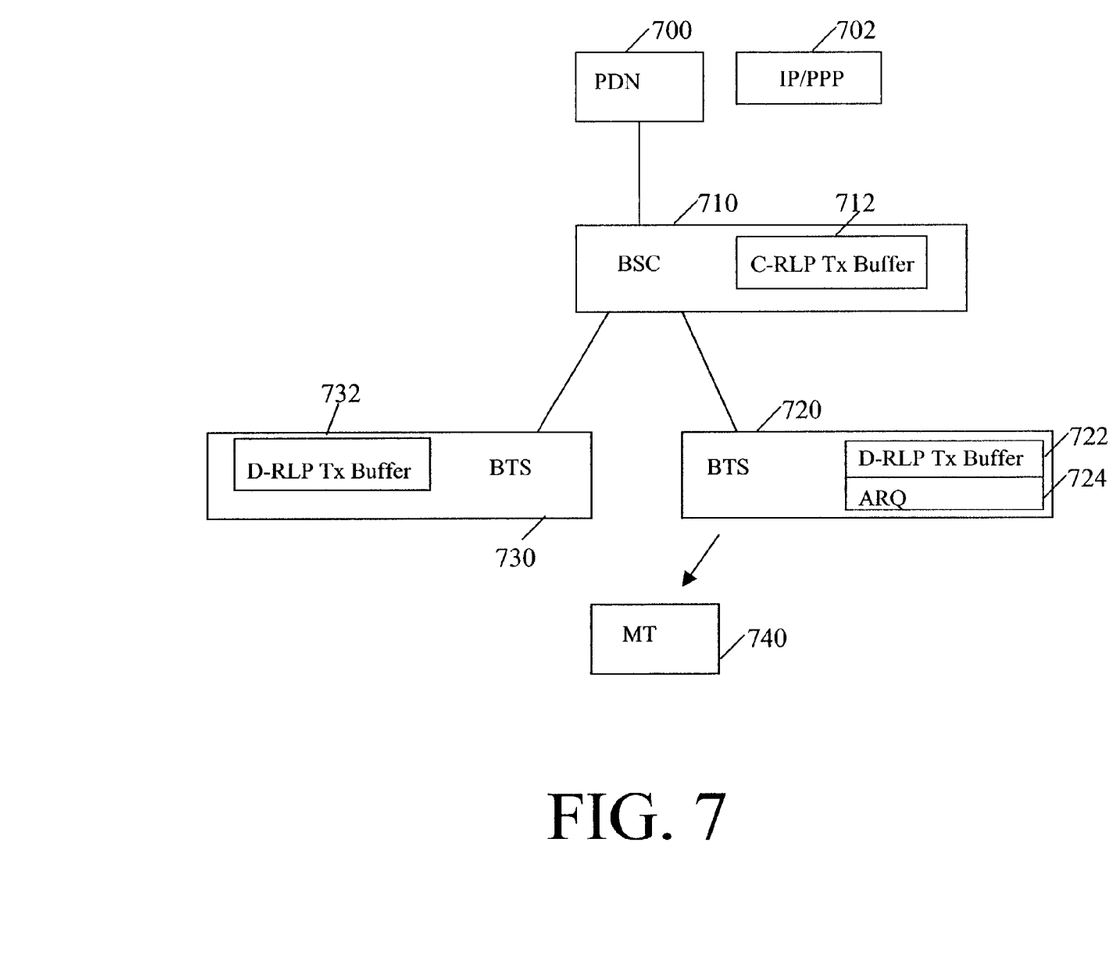
FIG. 7 is a block diagram showing a wireless network that incorporates the arrangement of FIG. 6 and showing some of the network entities associated with each network element that carry out the distributed mode.

FIG. 7 shows an example of a wireless network that incorporates the arrangement of FIG. 6 and which directs the data packets in the manner described above. Some of the entities that carry out the distributed mode are also shown. A BSC 710 includes C-RLP entity (not shown) that has a C-RLP transmit buffer 712, a RLP switch (not shown), an optional ARQ (not shown) and a multi-caster (not shown). The BSC is directed by a RLP control (not shown). The BTSs 720 and 730 each include a D-RLP entity (not shown) having a respective RLP transmit buffer 722, 732 and having a further ARQ 724. The BTSs also include a D-MAC entity (not shown) and a PHY entity (not shown).

As described above, a mobile terminal 740 maintains a list of the active BTSs. Each of the BTSs in the active BTS list, as well as the C-RLP entity of the BSC 710, maintains the same cache of newly received data as well as of a predetermined number of bytes of data previously transmitted to the mobile terminal. The cache is retained in the respective D-RLP transmit buffers 722, 732 of the BTSs and in the C-RLP transmit buffer 712 of the BSC 710.

To synchronize the C-RLP transmit buffer 712 and the D-RLP transmit buffers 722, 732, a byte addressing scheme is employed that is also used for automatic repeat requests (ARQs). Each byte of data that the BSC 710 receives from the PDN 702 is assigned a byte count sequence number that is greater than the sequence number of its immediately received predecessor. When the BTS 720 generates a RLP protocol frame which is to be transmitted to the mobile terminal 740, the BTS incorporates the sequence number of the first data byte of the frame into the frame header and also incorporates the length of the frame, namely the number of data bytes in the frame, into the frame header.

The D-RLP transmit buffers 722, 732 of the BTSs of the active BTS list also use common implementation-specific maximum and minimum values to control the flow of data bytes from the C-RLP transmit buffer 712 of the BSC 710. The synchronization of the D-RLP and C-RLP transmit buffers and the control of the flow of data bytes permit a continuous flow of data packets in the forward direction when the mobile terminal switches from one BTS to another and when the mobile terminal switches between the distributed mode and the centralized mode.

The following feedback schemes are proposed to support fast cell selection and switching. The mobile terminal periodically sends one or more reverse link messages to the each active BTSs that includes: (1) information that conveys the received signal-to-interference ratio for each of the active BTSs, (2) information that conveys the ARQ state and data flow integrity including: (a) the sequence number of the next data byte requested by the mobile terminal, (b) the sequence number of the last byte that was cleared from the re-sequencing buffer of the mobile terminal to the higher protocol layers, and (c) the sequence numbers of the data bytes that are to be retransmitted.

The information related to the measured signal-to-interference ratio of the active BTSs is used by the active BTSs to determine which BTS will next communicate with the mobile terminal, namely the BTS having the greatest measured signal-to-interference ratio. Then, starting with the next time slot, the selected BTS transmits data to the mobile terminal beginning with the next data byte that was requested by the mobile terminal. The next data byte may be the first data byte of new data or may be the first data byte of previously transmitted data that is to be retransmitted to the mobile terminal. When previously transmitted data is requested, the mobile terminal also transmits the number of bytes requested for retransmission and may transmit the number of times that retransmission of these data bytes was previously requested, such as when the mobile terminal RLP protocol supports packet combining.

The sequence number of the last byte that was cleared from the re-sequencing buffer of the mobile terminal is used by the BTSs in the active BTS list to clear any previously transmitted data that is currently retained by their D-RLP transmit buffers.

Referring back to FIG. 6, in the centralized mode, the RLP switch 614 directs the SDUs to the ARQ 616 which, in turn, delivers the SDUs to the C-MAC entity 622. The C-MAC entity 622 implements the C-MAC sub-layer protocol to direct the SDUs to the corresponding PHY entity 620 which implements the PHY layer protocol to convert the SDUs to PDUs for subsequent transmission to the mobile terminal.

Figure 8:
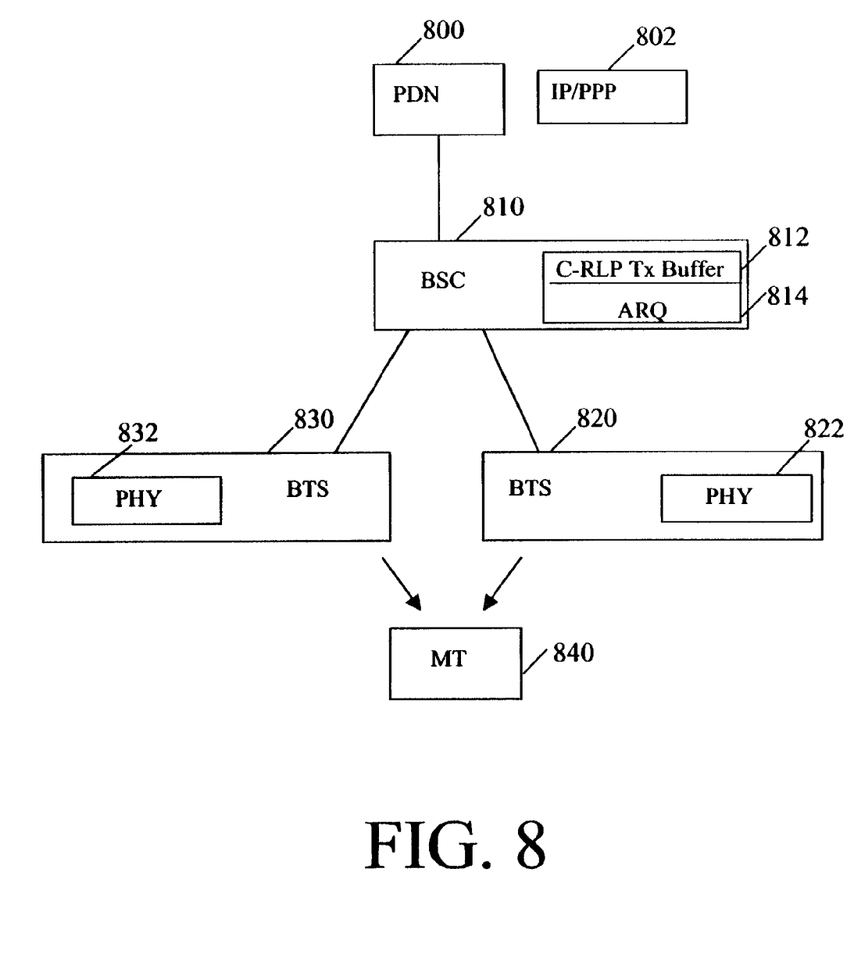
FIG. 8 is a block diagram showing a wireless network that incorporates the arrangement of FIG. 6 and showing some of the network entities associated with each network element that carry out the centralized mode.

FIG. 8 shows a further example of a wireless network that incorporates the arrangement of FIG. 6 in which some of the entities that carry out the centralized mode are shown. A BSC 810 includes a C-RLP entity (not shown) that has a C-RLP transmit buffer 812, a RLP switch (not shown) and an ARQ 814 and which is directed by a RLP control (not shown). The BSC also includes a C-MAC entity (not shown). BTSs 820 and 830 each include a respective PHY entity 822, 832.

The C-RLP transmit buffer 812 of the BSC 810 receives data bytes from the PDN 800 and passes the data via the RLP switch to the BTSs 820, 830. For non-transparent data packet delivery, the ARQ 814 of the BSC 810 provides error recovery using data retransmission. For transparent data packet delivery, the ARQ 814 is disabled and, instead, byte count integrity of the data flow is maintained using the above-described byte-addressing scheme.

When the mobile terminal switches from the centralized mode to the distributed mode, the N previous transmitted data bytes stored in the C-RLP transmit buffer 812 are sent to the BTSs of the active BTS list to maintain a continuous flow of flow of data packets in the forward direction.

Thus, the invention provides the flexibility of supporting different types of users and service providers by providing both low and high data rate services as well as supporting both low and high customer mobility. Further, the invention provides high spectral efficiency while maintaining high cell coverage.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method of providing wireless data communication at a control entity, said method comprising:
   receiving data in accordance with an Open Systems Interconnection (OSI) reference model level 3 protocol;
   selecting one of a centralized mode and a distributed mode;
   implementing, when said centralized mode is selected, all operations of an OSI reference model layer 2 protocol to deliver said data to at least one transceiver device; and
   implementing, when said distributed mode is selected, only a portion of operations of said layer 2 protocol to deliver said data to said at least one transceiver device; said portion of operations of said layer 2 protocol including at least those of a centralized protocol sub-layer.

2. The method of claim 1 wherein said receiving step includes receiving service data units (SDUs).

3. The method of claim 1 wherein said step of selecting one of said centralized mode and said distributed mode includes selecting according to at least one of a data transmission rate, mobility of a user device and a type of user application.

4. The method of claim 1 wherein said step of implementing when said distributed mode is selected includes delivering said data to a plurality of transceiver devices such that only one of said plurality of transceiver devices transmits said data to a user device.

5. The method of claim 1 wherein said step of implementing when said centralized mode is selected includes delivering said data to at least two transceiver devices such that both of said transceiver devices concurrently transmit said data to a user device.

6. The method of claim 1 wherein said portion of operations of said layer 2 protocol includes those of at least one of a centralized radio link protocol (C-RLP) sub-layer and a centralized medium access control (C-MAC) sub-layer.

7. The method of claim 1 further comprising the step of redelivering at least a portion of said data to said transceiver device.

8. The method of claim 1 further comprising the step of assigning a respective sequence number to each byte of said data prior to delivering said data.

9. A method of providing wireless data communication at a transceiver station, said method comprising:
receiving data from a control entity in accordance with a selected one of a centralized mode and a distributed mode, said receiving step including receiving, in accordance with said centralized mode, said data subsequent to implementation of all of an Open Systems Interconnection (OSI) reference model layer 2 protocol and receiving, in accordance with said distributed mode, said data subsequent to implementation of a portion of said OSI reference model layer 2 protocol;
implementing, when said distributed mode is selected, a further portion of said layer 2 protocol prior to transmitting said data, said further portion of said layer 2 protocol including at least one distributed protocol sub-layer; and
implementing an OSI reference model physical (PHY) layer protocol to transmit said data to a user device.

10. The method of claim 9 wherein said portion of said layer 2 protocol includes at least one of a centralized radio link protocol (C-RLP) sub-layer and a centralized medium access control (C-MAC) sub-layer.

11. The method of claim 9 wherein said further portion of said layer 2 protocol includes at least one of a distributed radio link protocol (D-RLP) sub-layer and a distributed medium access control (D-MAC) sub-layer.

12. The method of claim 9 wherein said step of implementing an OSI reference model PHY layer includes generating protocol data units (PDUs).

13. The method of claim 9 further comprising the step of generating, prior to transmitting said data, a frame comprising at least a portion of said data, said frame including a header that includes a sequence number corresponding to a first data byte of said frame and a length of said frame.

14. The method of claim 9 further comprising the step of receiving, from said user device, information that conveys at least one of: received signal-to-interference ratios of a plurality of transceiver devices, an automatic repeat request (ARQ) state, data flow integrity, measured pilot signal strength values of said plurality of transceiver devices, a sequence number of a next data byte to be transmitted to said user device, a sequence number of a last byte that was cleared from a re-sequencing buffer of said user device, and sequence numbers of data bytes that are to be retransmitted.

15. The method of claim 14 wherein said sequence number of said next data byte comprises at least one of: a first data byte of newly transmitted data and a first data byte of previously transmitted data.

16. An apparatus for providing wireless data communication, said apparatus comprising:

a buffer configured to receive data in accordance with an Open Systems Interconnection (OSI) reference model level 3 protocol;
a switch configured to select one of a centralized mode and a distributed mode;
an automatic repeat requestor configured to implement, when said centralized mode is selected, all operations of an OSI reference model layer 2 protocol to deliver said data to at least one transceiver device; and
a multi-caster configured to implement, when said distributed mode is selected, only a portion of operations of said layer 2 protocol to deliver said data to said at least one transceiver device;
said portion of operations of said layer 2 protocol including at that of a centralized protocol sub-layer.

17. The apparatus of claim 16 wherein said multi-caster is further configured to deliver said data to a plurality of transceiver devices such that only one of said plurality of transceiver devices transmits said data to a user device.

18. The apparatus of claim 16 wherein said automatic repeat requestor is further configured to deliver said data to at least two transceiver devices such that both of said transceiver devices concurrently transmit said data to a user device.

19. The apparatus of claim 16 wherein said automatic repeat requestor is further configured to redeliver at least a portion of said data to said transceiver device.

20. An apparatus for providing wireless data communication, said apparatus comprising:
a buffer configured to receive data in accordance with a selected one of a centralized mode and a distributed mode, said buffer being configured to receive said data in accordance with said centralized mode subsequent to implementation of all of an Open Systems Interconnection (OSI) reference model layer 2 protocol, said buffer being configured to receive said data in accordance with said distributed mode subsequent to implementation of a portion of said OSI reference model layer 2 protocol;
a distributed protocol entity configured to implement, when said distributed mode is selected, a further portion of said layer 2 protocol prior to transmitting said data, said further portion of said layer 2 protocol including at least one distributed protocol sub-layer; and
a physical layer entity configured to implement an OSI reference model physical (PHY) layer protocol to transmit said data to a user device.

21. The apparatus of claim 20 further comprising a centralized medium access control (C-MAC) sub-layer entity.

22. The apparatus of claim 20 wherein said distributed protocol entity includes at least one of a distributed radio link protocol (RLP) entity and a distributed medium access control (D-MAC) sub-layer entity.

23. The apparatus of claim 20 further comprising a retransmitter configured to receive a sequence number of a next data byte to be transmitted to said user device, said sequence number comprising at least one of a first data byte of newly transmitted data and a first data byte of previously transmitted data.

24. A system for providing wireless data communication, said apparatus comprising:
a controller comprising a central protocol entity which comprises:

a buffer configured to receive data in accordance with an Open Systems Interconnection (OSI) reference model level 3 protocol;

a switch configured to select one of a centralized mode and a distributed mode;

an automatic repeat requestor configured to implement, when said centralized mode is selected, all operations of an OSI reference model layer 2 protocol to deliver said data to at least one transceiver device; and a multi-caster configured to implement, when said distributed mode is selected, only a portion of operations of said layer 2 protocol to deliver said data to said at least one transceiver device;

said portion of operations of said layer 2 protocol including at that of a centralized protocol sub-layer;

said at least one transceiver device comprising:

a further buffer configured to receive said data in accordance with said selected one of said centralized mode and said distributed mode;

a distributed protocol entity configured to implement, when said distributed mode is selected, a further portion of said layer 2 protocol prior to transmitting said data, said further portion of said layer 2 protocol including at least one distributed protocol sub-layer; and a physical layer entity configured to implement an OSI reference model physical (PHY) layer protocol to transmit said data to a user device;

said controller further comprising a control entity configured to control said central protocol entity and said distributed protocol entity.

25. The system of claim 24 wherein said multi-caster is further configured to deliver said data to a plurality of said transceiver devices such that only one of said plurality of transceiver devices transmits said data to a user device.

26. The system of claim 24 wherein said automatic repeat requester is further configured to deliver said data to at least two of said transceiver devices such that both of said transceiver devices concurrently transmit said data to a user device.

27. An apparatus for providing wireless data communication, said apparatus comprising:

means for receiving data in accordance with an Open Systems Interconnection (OSI) reference model level 3 protocol, means for selecting one of a centralized mode and a distributed mode;

means for implementing, when said centralized mode is selected, all operations of an OSI reference model layer 2 protocol to deliver said data to at least one transceiver device; and means for implementing, when said distributed mode is selected, only a portion of operations of said layer 2 protocol to deliver said data to said at least one transceiver device;

said portion of operations of said layer 2 protocol including at that of a centralized protocol sub-layer.

28. An apparatus for providing wireless data communication, said apparatus comprising:

means for receiving data in accordance with a selected one of a centralized mode and a distributed mode; said means for receiving including means for receiving, in accordance with said centralized mode, said data subsequent to implementation of all of an Open Systems Interconnection (OSI) reference model layer 2 protocol and including means for receiving, in accordance with said distributed mode, said data subsequent to implementation of a portion of said OSI reference model layer 2 protocol;

means for implementing, when said distributed mode is selected, a further portion of said layer 2 protocol prior to transmitting said data, said further portion of said layer 2 protocol including at least one distributed protocol sub-layer; and means for implementing an OSI reference model physical (PHY) layer protocol to transmit said data to a user device.

* * * * *